United States Patent [19]
Mori

[11] 3,757,654
[45] Sept. 11, 1973

[54] CAMERA HAVING AUTOMATIC EXPOSURE AND AUTOMATIC FLASH CONTROLS

[75] Inventor: Chiharu Mori, Tokyo, Japan

[73] Assignee: Asahi Kogaku Kogyo Kabushiki Kaisha, Tokyo, Japan

[22] Filed: Apr. 10, 1972

[21] Appl. No.: 242,593

[30] Foreign Application Priority Data
Apr. 19, 1971 Japan.................. 46/25162

[52] U.S. Cl.............................. 95/10 CE, 95/10 CT
[51] Int. Cl.............................................. G03b 7/08
[58] Field of Search................... 95/10 CE, 10 CT, 95/11.5 R

[56] References Cited
UNITED STATES PATENTS

| | | | |
|---|---|---|---|
| 3,535,991 | 10/1970 | Kitai | 95/10 |
| 3,522,763 | 8/1970 | Dietz | 95/10 |
| 3,568,582 | 3/1971 | Uchida | 95/11.5 |
| 3,648,053 | 11/1970 | Sato | 95/10 X |
| 3,591,829 | 7/1971 | Murata | 95/10 X |
| 3,464,332 | 9/1969 | Davison et al. | 95/10 |

Primary Examiner—Samuel S. Matthews
Assistant Examiner—Michael L. Gellner
Attorney—Harold D. Steinberg and Martin Blake

[57] ABSTRACT

A shutter timing circuit automatically determines when flash will be used and its duration. The timing circuit computes proper shutter speed using film sensitivity, diaphragm valve and scene brightness and compares that with a preset shutter speed. When the computed exposure time is longer that the preset time, an enabling circuit allows flash to be triggered when the shutter is opened. The actual speed of the shutter is determined by the timing circuit. If flash is used, the flash is terminated and the shutter closed at the same time by the timing circuit. The diaphragm, film sensitivity and brightness inputs are logarithmically compressed prior to computation of the proper shutter speed and the resultant computed valve is logarithmically expanded prior to timing of the exposure.

12 Claims, 2 Drawing Figures

CAMERA HAVING AUTOMATIC EXPOSURE AND AUTOMATIC FLASH CONTROLS

BACKGROUND OF THE INVENTION

The present invention relates to cameras.

In particular, the present invention relates to cameras, especially single lens reflex cameras, which are capable of automatically determining exposure time in accordance with factors such as the aperture, the film speed, and the lighting conditions at the object which is to be photographed.

Cameras of this general type are well known. Such cameras are generally provided with structure for providing flash illumination when the available light is insufficient for achieving a proper exposure.

At the present time, the operator of the camera must decide whether or not to use the flash structure. Under certain circumstances it may not be known whether flash illumination is required for proper exposure, and even if it is possible for the operator to determine that the exposure conditions are such that additional artificial illumination is required, a considerable inconvenience is involved in changing the operation of the camera so that it will operate with flash illumination rather than simply with the available light.

The above problems are particularly encountered where the operator realizes that a certain exposure time is required in order to achieve a proper photograph. For example, where a camera is hand-held the exposure time cannot be made too great since otherwise the unavoidable movement of the hand of the operator will result in a blurred image. Also, when photographing objects which are moving rapidly, it is essential to have a relatively short exposure time in order to "freeze" the motion.

When photographing particularly with conditions as set forth above it may be required to have additional artificial illumination in order to be able to reduce the exposure time to a value which will achieve a proper photograph avoiding defects which would result either from holding the camera in the hand or from attempting to photograph a rapidly moving object. Under such conditions an operator may decide to use flash illumination, but of course this type of operation involves a considerable inconvenience with inherent inaccuracies because of the necessity of roughly estimating the camera settings required with flash illumination.

The above conditions are particularly aggravated with that type of camera, which is very popular, which has so-called through-the-lens light measurement. Cameras of this latter type automatically determine the exposure time in accordance with measurement of light which has already passed through the objective of the camera. While there is the advantage of an imcrease in precision because of compensation for the passage of the light through the camera objective, the great drawback of this type of camera resides in the fact that it is not possible to continue to measure the light during actual exposure. When the shutter is opened to expose the film the measurement of the light with cameras of this type is necessarily interrupted, and it is precisely at this time that the flash structure will operate to provide the additional illumination, so that precision of operation under the above conditions is impossible to achieve with conventional cameras.

SUMMARY OF THE INVENTION

It is accordingly a primary object of the present invention to provide a structure which will avoid the above drawbacks.

In particular, it is an object of the present invention to provide a structure which on the one hand is capable of automatically determining the exposure time and which on the other hand is also capable of automatically determining whether or not additional artificial illumination is required to achieve an exposure time which is no greater than a preselected exposure time.

In particular, it is an object of the present invention to provide a structure of this type which is capable of automatically determining exposure time in a highly precise manner either with or without flash illumination, with the controls operating even when the shutter is open.

Yet another object of the present invention is to provide a camera structure of the above type which is capable of automatically adapting the operation either to the use of artificial illumination or to the use only of available light.

Also, the objects of the present invention include the provision of a structure of the above type which does not require attachment of any special structures to a camera.

Thus, it is an object of the invention to provide a structure of the above type which is capable of operating automatically in such a way that high accuracy and high reliability are achieved with fully automatic controls either with or without flash illumination, with the requirement of flash illumination also being automatically determined.

According to the invention the camera has an electrical computing means for computing from electrical factors which respectively correspond to aperture, film speed and lighting conditions at the object to be photographed, an electrical quantity corresponding to the exposure time required for proper exposure in accordance with these factors. An electrical selecting means is provided for selecting an electrical quantity which corresponds to a selected exposure time. An electrical comparing means is electrically connected with the selecting means and the computing means for comparing these quantities and for automatically assuming a given condition when the exposure time corresponding to the computed quantity is greater than the exposure time corresponding to the selected quantity. A flash means is provided to give additional illumination at the object which is to be photographed. A flash-actuating means is electrically connected to the comparing means and to the flash means for automatically responding to the above condition of the comparing means for actuating the flash means to provide the additional illumination when the exposure time corresponding to the computed quantity is greater than the exposure time corresponding to the selected quantity. An electrical timing means is electrically connected with the computing means for determining a proper exposure time according to all of the above factors with or without the additional illumination from the flash means, and an exposure-terminating means is electrically connected with the timing means to be actuated thereby for terminating the exposure after an interval which is determined by the timing means.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
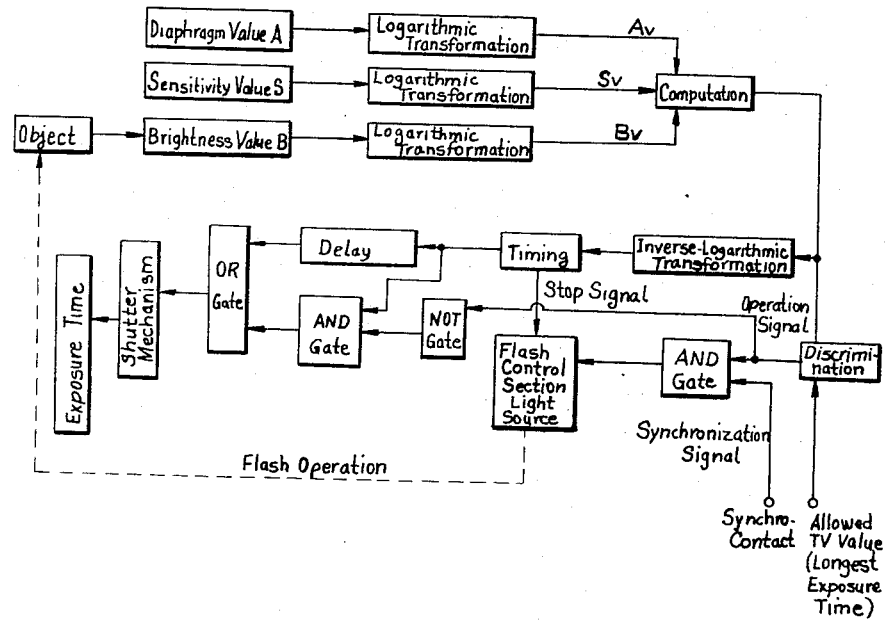
FIG. 1 is a block diagram of an embodiment of the invention.

Referring to the drawings, the invention is illustrated therein in connection with an automatic exposure control system for a single lens reflex camera. In this system there is an electric shutter control circuit having a light-measuring section where an external photosensitive means receives light outside of the objective of the camera, this light passing, for example, through a window at the front wall of the camera. The measurement of the external light by the external photosensitive means is compensated with an internal photosensitive means which receives light which has passed through the objective of the camera, and the compensated value is retained for a given time. The electric shutter control circuit is combined with a speed light synchronized flash apparatus so that when exposure time, as determined by photographic computation of the factors of object brightness, diaphragm setting, and film speed is longer than the exposure time desired by the operator, then in an automatic manner the flash apparatus is actuated to provide additional artificial illumination and in this way a proper exposure time is automatically achieved in accordance with the lighting conditions at the object including the effect of the flash illumination with the above light-measurement system. Therefore, with the present invention if the operator determines the longest permissible exposure time taking into consideration possible hand-shaking where any camera is hand-held or photographing of moving objects, with this longest permissible value of exposure time being set so as to be short enought to compensate for the latter factors, then with the system of the invention a selection is automatically made with respect to whether or not a synchronized flash exposure should be carried out, and in this way film exposure is automatically controlled so as to achieve a proper exposure.

Referring now to FIG. 1, which is a block diagram of an automatic exposure-controlled system according to the present invention, several exposure-determining factors are fed to a computing means which computes the exposure time.

Thus, the diaphragm setting value A indicated at the upper left of FIG. 1, together with the film speed value S are logarithmically transformed and are delivered in the form of electrical quantities to the computing means indicated by the block at the upper right of FIG. 1. These electrical quantities $A_v$ and $S_v$ are in the form of voltage outputs having values in accordance with the APEX system. The light traveling from the object forms the object brightness value B with the use of suitable photosensitive elements, and the brightness value B is also logarithmically transformed to obtain a voltage output $B_v$, also in accordance with the APEX system.

The computation performed by the computing means which receives these factors is carried out in accordance with the APEX system so that the photographic computation $B_v + S_v - A_v$ is carried out with respect to the above voltage outputs. As a result the computing means computes a voltage output corresponding to the value $T_v$ of the exposure time T in accordance with the APEX system.

This voltage output is inversely logarithmically transformed, as indicated in the block diagram of FIG. 1, to provide a current which is inversely proportional to the exposure time, and this is the charging current used for timing purposes, as indicated by the block shown in FIG. 1 to the left of the inverse logarithmic transformation block.

Either the voltage output $T_v$ provided by the computing means or this charging current for timing purposes, which is inversely proportional to the exposure time and which is derived from the value $T_v$, is compared by a comparing means, represented by the discrimination box in FIG. 1, with the threshold value established for controlling flash discharge operation on the basis of a limitation of the exposure time which is selected by the operator, so as to determine whether or not an operative or actuating signal for synchronized flash illumination should be produced. Thus, it will be noted that in the lower right of FIG. 1 there is an indication of a selection of the longest permissible exposure time represented by the $T_v$ value, and this selection is fed to the discrimination block shown in FIG. 1, so that the comparing means which this block represents will determine whether or not the indicated operation signal will be produced.

If the comparing means does not assume a condition at which the operation signal for the flash structure is produced, then the exposure is made without flash illumination, and the charging current for a capacitor used for determining the exposure time is based on the value $T_v$ which is computed as indicated above. Thus, in this case from the timing block shown in FIG. 1 a signal in accordance with the proper exposure time will be delivered through the delay block, which serves a purpose referred to below, to the indicated OR gate, which then actuates the shutter mechanism to achieve a proper exposure time as indicated in the block diagram. The delay block shown in FIG. 1 is utilized to prevent flash illumination, when it is called for, from providing an improper operation of the system of the invention, as described in greater detail below.

If, on the other hand, the comparing means formed by the discrimination block of FIG. 1 assumes a condition which produces the operation signal indicated in FIG. 1, then the exposure is made with flash illumination. This operation signal is delivered to the AND gate shown at the lower right portion of FIG. 1. This AND gate also must receive a signal resulting from closing of the switch of the camera which closes in synchronism with opening of the shutter, so that the illuminating flash will occur simultaneously with exposure of the film by the shutter. Thus, when this AND gate receives these two signals the flash control section is actuated to provide additional light which increases the illumination at the object, as indicated by the dotted line in FIG. 1.

Thus, when the shutter of the camera is tripped to expose the film the synchronous switch for flash operation is automatically closed since it is in driving connection with the shutter-operating mechanism, so as to transmit a synchronization signal for synchronized flash to the AND gate as the second input thereto which is required for transmitting the signal to the flash section. As a result a flash signal is applied to the flash section and synchronized artificial illumination of the object is carried out.

Therefore, the light-receiving section, indicated by the block which represents brightness value B, now receives a light input from the object resulting not only from the available light when the light was initially measured but also from the additional flash illumination. Up to the time of actual opening of the shutter to expose the film, the above computation and comparing operations were carried out to determine whether or not additional flash illumination was required. When during the continued depression of the shutter-operating button of the camera the shutter is actually tripped to open and expose the film, the exposure is actually made with or without the flash illumination depending upon the above factors, and now the timing means, represented by the timing block of FIG. 1, operates to integrate the input light quantity from the object. This timing means thus determines the proper exposure time, taking into consideration all of the above factors, and after a required interval has elapsed, as determined by the timing means, a flash stop signal is transmitted to the flash control section to stop the operation of the flash control section, and the shutter-operating structure acts to terminate film exposure.

In the event that the comparing means, formed by the discrimination block of FIG. 1, determines that an operation signal should be given to actuate the flash control section, then during the second phase of the operation when the light-measuring structure measures the available light and the artificial light, and when the shutter opens to expose the film, the operation signal is transmitted a second time through the comparing means as represented by the NOT gate in FIG. 1. Thus, the NOT gate in FIG. 1 represents the same structure as the discrimination block but operates during the second phase when film exposure occurs, subsequent to determination of whether or not the flash illumination is required. The NOT gate of FIG. 1 represents the comparing means when it is in a condition which calls for the flash-operating signal, and it is only when the comparing means is in the condition represented by the NOT gate of FIG. 1 that a signal is transmitted to the AND gate to render the latter operative. Thus the left illustration of the AND gate in FIG. 1 represents the operation thereof during the above second phase of the operation when the shutter is open and film is exposed with flash illumination. During the second phase of the operation the AND gate receives a signal not only from the NOT gate but also from the timing means after a lapse of an interval of flash illumination which is required for proper exposure, and when both of these signals, namely that from the timing means and that from the NOT gate reach the AND gate during this second phase of the operation, a signal is transmitted to the OR gate for terminating the exposure in the manner described above. Thus, the OR gate can receive an exposure-terminating signal either during operation without flash illumination or during operation with flash illumination to terminate the exposure at the proper time in either case.

Figure 2:
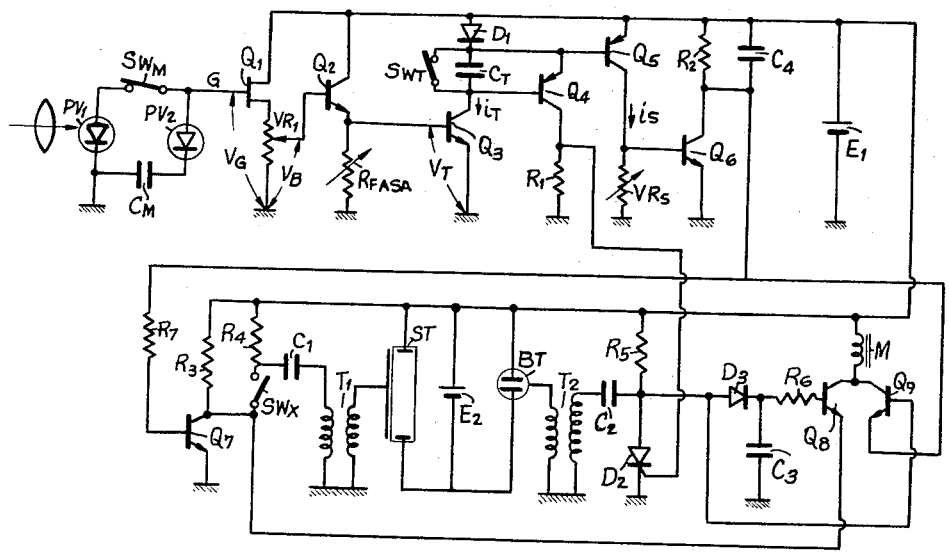
FIG. 2 is a wiring diagram of one embodiment of the structure of the invention.

The circuitry of the invention, represented by the block diagram of FIG. 1, is illustrated in detail in FIG. 2.

The structure which determines the brightness value B is formed by an external and internal photosensitive means shown at the upper left portion of FIG. 2. The light-receiving element $PV_1$ forms the internal photosensitive means and receives light after the light has traveled through the objective, as shown schematically in FIG. 2. The photosensitive means $PV_2$ receives the external light and forms the external photosensitive means. These light-receiving elements are of equal photoelectric transformation characteristics and have a rapid response. The photoelectric transformation characteristic is, as with a silicon photocell, proportional to the logarithmic value of the light input intensity. The light-receiving element $PV_1$ is placed in the path of light which has passed through the camera objective, while the light-receiving element $PV_2$ is placed in the path of light outside of the objective, this latter light passing, for example, through a suitable light-receiving window carried by the front wall of the camera housing.

A memory capacitor $C_M$ is connected between the pair of photosensitive means $PV_1$ and $PV_2$, as illustrated, to perform a memory or information-retaining operation. During light-measurement, the light-receiving element $PV_1$ receives a light input from the object, with this input traveling through the camera objective while the light-receiving element $PV_2$ receives a light input from the object but not traveling through the camera objective. The internal photosensitive means $PV_1$ provides an output voltage $V_1$ which, depending upon the light-measuring conditions which include the optical characteristics of the camera objective and on the basis of the photoelectric transformation characteristic is proportional to the logarithmic value of the intensity of the light input from the object. At the light-receiving element $PV_2$, or in other words the external photosensitive means, there is produced an output voltage $V_2$ which, depending upon the light measurement condition of the photosensitive means $PV_2$ and on the basis of the photoelectric transformation characteristic is proportional to the logarithmic value of the intensity of the light input from the object. When the switch $SW_M$ is closed, the voltage $V_3$ across the capacitor $C_M$ is $V_1 - V_2$, corresponding to the difference between the light input intensities of the light respectively received by the pair of photosensitive means. Thus, the voltage $V_3$ across the memory capacitor $C_M$ has a value depending upon the different light-measuring conditions, which is to say the difference between external and internal light-measurement. This value is determined by the optical nature of the objective of the camera and the condition of the distribution of light intensity at the object.

With a single-lens reflex camera, the mirror which reflects an image of the object to the viewfinder is swung up just prior to exposure, and in driving connection with the upward swinging movement of the mirror, which takes place automatically during depression of the shutter-tripping button, the switch $SW_M$ is opened, the actual opening of the switch taking place immediately before the mirror is swung up. Thus, upon opening of this switch there is provided just prior to exposure of the film an output voltage $V_G$ at the point G, and this voltage has a value corresponding to the output of the external photosensitive means as compensated by the output of the internal photosensitive means, due to the action of the capacitor $C_M$. The required compensation value is memory-retained as a voltage across the capacitor $C_M$. Thus, with this structure it is possible to continue to measure the light after the shutter opens with the light measurement at this time being the external light measurement as compensated by the internal light measurement.

The voltage output $V_G$ is applied as an input to a high input resistance type variable gain amplifier formed by the field effect transistor $Q_1$ and a variable resistor $VR_1$. The output voltage $V_B$ is applied to a transistor $Q_3$ for logarithmic expansion by way of a buffer circuit constituted by a transistor $Q_2$ and a variable resistor $R_{F.ASA}$. This variable resistor is adjusted to introduce the factors of aperture and film speed. Thus, the components $Q_2$, $Q_3$ form the computing means for computing the proper exposure time in accordance with the factors of aperture, film speed, and lighting conditions at the object to be photographed. The variable resistor $VR_1$ is properly adjusted so that the collector current $i_T$ of transistor $Q_3$ is proportional to the intensity of light from the object, and thus the output voltage $V_B$ has a value corresponding to the value $B_V$ of object brightness B according to the APEX system.

In the above buffer circuit, the photographic computation based on the factors of diaphragm setting A and film speed S is carried out, which is to say a photographic computation is carried out with provision, as the load on the transistor $Q_2$ of a diaphragm value and film speed value determined by the setting of the variable resistor $R_{F.ASA}$ which is adjusted according to the value $A^2/S$. With the voltage $V_B$ corresponding to the value $B_V$ applied as the input to the buffer circuit, the value $A^2/S$ is transformed into a logarithmically compressed emitter voltage value of the transistor $Q_2$ by the action of the variable resistor $R_{F.ASA}$ and the diode action of the base-emitter of transistor $Q_2$. If the emitter voltage characteristic, which is determined on the basis of the logarithmic compression characteristic of the transistor $Q_2$, is so established as to satisfy the values $S_v - A_v$ constituted by the values of aperture A and film speed S according to the APEX system, then the emitter voltage $V_T$ of transistor $Q_2$ has a value corresponding to the value $T_v$ obtained by a photographic computation according to the expression $B_v + S_v - A_v$ based upon the APEX system. Then the voltage output $V_T$ is inversely logarithmically transformed and as referred to above in connection with the block diagram of FIG. 1, or in other words logarithmically expanded, by the transistor $Q_3$ and there is produced in this way a timing charging current $i_T$ as a collector output current of the transistor $Q_3$.

In other words, the transistor $Q_3$ produces a current corresponding to the value $T_v$ obtained by photographic computation of the factors $B_v$, $A_v$ and $S_v$, and acts as a current source for achieving a timing charge having a constant current characteristic due to the collector voltage-current characteristic of the transistor.

A timing capacitor $C_T$ forming the timing means represented by the timing block of FIG. 1, is connected in series with the collector electrode of the transistor $Q_3$ and in series with the timing capacitor is a logarithmic transformation diode $D_1$. The timing capacitor $C_T$ is bridged by the normally closed switch $SW_T$ which forms a switch means for preventing the timing means for operating except during the second phase of the operation when the shutter is opened to expose film. This normally closed switch means $SW_T$ is controlled in a known manner so that it opens in synchronism with the start of the run of the leading curtain of the focal plane shutter to the open position of the shutter, and the switch $SW_T$ closes when the trailing curtain runs to terminate the exposure by closing the shutter.

In order to provide the operator with the possibility of limiting the longest exposure time, a selecting means is provided for enabling the operator to select an electrical quantity which will correspond to the maximum exposure time which the operator considers permissible. This selecting means takes the form in the illustrated example of the variable resistor $VR_s$, and this variable resistor has such a construction that its resistance value is determined in accordance with the selected limit of the exposure time.

It is to be noted that the entire circuitry is set into operation upon closing of a switch which is not illustrated and which delivers to the circuitry energy from the source $E_1$ shown at the upper right of FIG. 2.

During light measurement as described above, there is obtained a timing charge current $i_T$ as the collector current of the transistor $Q_3$. This current $i_T$ is inversely proportional to the exposure time corresponding to the value $T_v$ determined by the computing means from the factors of object brightness value $B_v$, the diaphragm setting value $A_v$ and the film speed value $S_v$. After this current $i_T$ is logarithmically compressed by the logarithmic transformation diode $D_1$, the switch means $SW_T$ remaining closed at this time, the output is applied to the transistor $Q_5$ between the base and emitter thereof, this transistor being connected in parallel with the diode $D_1$. Due to the diode action which takes place between the base and emitter of the transistor $Q_5$, the collector current $i_s$ of the transistor $Q_5$ has a value which results from logarithmic expansion of the logarithmically compressed output, which is to say a value which is proportional to the timing charge current $i_T$.

Thus, it will be seen that the computing means has a conductor along which the current value $i_s$ flows, and this current value corresponds to the exposure time calculated by the computing means in accordance with the above factors. The conductor along which the current $i_s$ is connected in series with the variable resistor $VR_s$, and the voltage drop due to the computed electrical quantity corresponding to the current $i_s$ and thus to the computed exposure time and the selected electrical quantity corresponding to the resistance of the variable resistor $VR_s$ and thus to the selected maximum exposure time is compared with the threshold value of the NOT gate or comparing means formed by the transistor $Q_6$ and the resistor $R_2$.

Thus, it is the transistor $Q_6$ which forms the comparing means represented by the discrimination block of FIG. 1 and it is this structure which during the second phase of the operation forms the NOT gate illustrated in FIG. 1. With this structure when the voltage drop at the series-connected conductor which carries the current $i_s$ and the resistor $VR_s$ is greater than the threshold value of the transistor $Q_6$, which is to say when the exposure time determined by the light input intensity from the object is shorter than the maximum exposure time selected by the operator, then the output of transistor $Q_6$, which is to say the collector voltage thereof, is at "0" level (saturated state). In the reversed case, the collector voltage is at "1" level (cut-off state). Thus, when the computed exposure time value is greater than the maximum selected exposure time the transistor $Q_6$ assumes a non-conductive state, thus acting as a NOT gate. On the other hand, when the computed exposure time is less than the maximum selected exposure time the transistor $Q_6$ is in a conductive state and thus the comparing means formed by the transistor $Q_6$ does not assume the condition corresponding to that which obtains when the computed exposure time is greater than the selected exposure time.

The AND gate structure is formed in part by the transistor $Q_7$ with the output of the NOT circuit (the collector volage of the transistor $Q_6$) acting as the input thereto. Due to the above operations, the action of the transistor $Q_7$ will be necessarily controlled. Therefore, when the exposure time due to the light input intensity of the object is shorter than the exposure time limited by selection of the operator, the transistor $Q_6$ is conductive while the transistor $Q_7$ is non-conductive. On the other hand, when the exposure time due to light input from the object is longer than the exposure time limit selected by the operator, the transistor $Q_6$ is non-conductive and the transistor $Q_7$ is conductive.

Thus, it is under these latter conditions that one of the two signals for the AND gate is received, this signal being the operation signal indicated in FIG.1. The second signal for the AND gate comes from the synchro-switch $SW_x$ which is a normally open switch. This switch automatically closes so as to control the instant of flash operation and is in driving connection with the release of the shutter to start the exposure. In the case where the exposure time computed with the light input intensity from the object is longer than the maximum exposure time selected by the operator, then due to closing of the synchro-switch $SW_x$ in synchronism with the opening of the shutter, the transistor $Q_7$ which is now in a conductive state acts to bring about instantaneous discharge of the capacitor $C_1$ which has been charged through the resistor $R_4$. This instantaneous discharge of the capacitor $C_1$ transmits a flash signal to the flash discharge tube ST through the trigger transformer $T_1$ so that flash illumination is produced at this time.

With the single lens reflex camera, the mirror is swung up just before synchronized flash illumination simultaneously with opening of the shutter. Therefore at this time the second phase of the operation takes place with the light input from the object including not only the available light but also the light reflected from the object due to the flash illumination and received at this time only by the external photosensitive means $PV_2$, so that now the above operations are repeated with creation of the timing charge current $i_T$ at the transistor $Q_3$ again taking place. The leading curtain of the focal plane shutter has run to the open position, and exposure is under way. In synchronism with the start of the run of the leading curtain to the open shutter position, the switch means $SW_T$ is automatically opened, as described above, so that at this time which is to say during the second phase when the film is exposed, the timing means formed by the capacitor $C_T$ operates, and this timing capacitor is linearly charged with the charging current $i_T$. When the voltage across the timing capacitor $C_T$ reaches a level which, through an amplifier constituted by a transistor $Q_4$ and a resistor $R_1$, makes an SCR means $D_2$ conductive, a second capacitor $C_2$, which has been charged through a resistor $R_5$, is instantaneously discharged through the SCR means $D_2$. The instantaneous discharge of the capacitor $C_2$ actuates the second trigger transformer $T_2$, shown in FIG. 2, so that the flash tube ST instantaneously stops operating and instead the discharge takes place through the path of less resistance formed by the bypass discharge tube BT, and through this quenching arrangement the flash illumination is terminated. Thus, it will be seen that the capacitor $C_2$ together with the transformer $T_2$ and the bypass discharge tube BT form a flash-terminating means acting in response to operation of the SCR means $D_2$ by the timing means.

Simultaneously with the above operations the electromagnetic means M has remained energized with a current flowing therethrough, this electromagnetic means forming an exposure-terminating means. In a well known manner the electromagnetic means acts to hold the cocked trailing curtain in a position for release to run to the shutter-closing position as soon as the electromagnetic means M becomes unenergized. The termination of the energizing of the electromagnetic means M is brought about through either of the transistors $Q_8$ or $Q_9$ which form the OR gate of FIG. 1. In the case where exposure has taken place with flash illumination, the SR means $D_2$ by assuming its conductive state renders the transistor $Q_8$ nonconductive, with a certain time delay determined approximately by the resistor $R_6$, the capacitor $C_3$ and the off-set voltage of the transistor $Q_8$, the resistor $R_6$ being connected between the transistor $Q_8$ and the diode $D_3$, as illustrated in FIG. 2. This latter structure forms a delay means adapting the operations to the flash operation and shutter operation in the case where flash illumination takes place. Therefore, when the SCR $D_2$ becomes conductive so as to render the transistor $Q_8$ nonconductive, the electromagnetic means M becomes nonconductive, and thus the exposure-terminating means operates to terminate the exposure. Through the action of unillustrated mechanical elements the trailing curtain is released to run down to the closed position of the shutter, thereby completing exposure of the film.

It will be noted that the transistor $Q_9$ is connected in parallel with the transistor $Q_8$ but is also connected in series with the transistor $Q_6$. Since the transistor $Q_6$ is in a nonconductive state when the flash is operated through the flash-actuating means formed by the transistor $Q_7$, the transistor $Q_9$ will at this time have no influence on control of the electromagnetic means M.

On the basis of the timing charge current corresponding to the value $T_v$ of the transistor $Q_3$, the capacitance of the timing capacitor $C_T$ and the switch-over level of the SCR means $D_2$ for controlling the action of the electromagnetic means M are properly selected so that an exposure time corresponding to the value $T_v$ is obtained. In addition, the delay time determined by the resistor $R_6$ and the capacitor $C_3$ is selected in such a way as to be longer than the fully-open slit exposure time duration which is generally one-sixtieth or one one hundred twenty-fifth second. Then, both under available light only and under synchronized flash illumination, a proper exposure of film is automatically carried out.

A capacitor $C_4$ and the resistor $R_2$ form the delay means represented by the block of FIG. 1 which acts in such a way that the states of the transistors $Q_6$ and $Q_7$, which is to say the conductive or nonconductive states thereof, as determined by light measurement, will not be influenced by the synchronized flash illumination when the shutter is open and film is exposed. The delay time is properly selected on the basis of flashtime duration.

Therefore, with the above structure of the invention, during the second phase of the operation when the shutter is opened and film is exposed the AND gate formed by the transistor $Q_7$ receives a signal from the NOT gate formed by the transistor $Q_6$ which now is in a nonconductive state, and from the SCR means $D_2$ which is actuated by the timing means formed by the capacitor $C_T$ in order to render the transistor $Q_8$ nonconductive and thus terminate the energizing of the electromagnetic means M and thus terminate the energizing of the electromagnetic means M and thus terminate the exposure. During the first phase of the operation the AND gate formed by the transistor $Q_7$ receives a signal from the switch $SW_x$ and from the comparing means formed by the transistor $Q_6$, which forms the discriminating block of FIG. 1 and which assumes a nonconductive condition when the exposure time which is computed is greater than the selected maximum exposure time, in order to actuate the flash means to bring about additional artificial illumination.

In the case where the exposure time determined by the light input intensity from the object during the first light-measuring phase is shorter than the maximum exposure time selected by the operator, the transistor $Q_7$, which forms the AND gate together with the synchroswitch $SW_x$, remains nonconductive, and of course the transistor $Q_6$ is in a conductive state. Accordingly, at this time even though the switch $SW_x$ closes simultaneously with tripping of the shutter to start the exposure, the capacitor $C_1$ cannot discharge and therefore there is no actuation of the flash means and there is no flash illumination. At this time the mirror is swung up and the mechanism simultaneously releases the leading curtain which runs down to the open shutter position. In synchronism with this operation the switch means $SW_T$ opens so that the timing capacitor $C_T$ starts to be linearly charged with the timing charge current $i_T$. When the voltage across the timing capacitor $C_T$ reaches, by amplifier constituted by transistor $Q_4$ and the resistor $R_1$, a level which makes the SCR means $D_2$ conductive, then the transistor $Q_9$ is rendered nonconductive. As was pointed out above, under the conditions where the computed exposure time is less than the maximum selected exposure time, the transistor $Q_6$ is in a conductive state thus rendering the transistor $Q_9$ conductive, and at this time the transistor $Q_8$ does not enter into the control of the electromagnetic means because the transistor $Q_7$ is in a nonconductive state. The conductive state of the transistor $Q_9$ thus operates at this time to maintain the electromagnetic means M energized. The response of the SCR means $D_2$ to the timing means which renders the SCR means $D_2$ conductive, results in rendering the transistor means $Q_9$ nonconductive, and thus energizing of the electromagnetic means M is terminated and now the exposure-terminating means operates to terminate the exposure due to the fact that the transistor means $Q_9$ assumes a nonconductive state. When the electromagnetic means M becomes nonconductive the mechanical elements are actuated to release the trailing curtain which now runs down so as to terminate the exposure. As was pointed out above the transistor $Q_8$ is connected in parallel with the transistor $Q_9$ but is in series with the transistor $Q_7$, so that since the latter transistor is now in a nonconductive state the transistor $Q_8$ has no influence on the electromagnetic means M.

As was pointed out above, with a single lens reflex camera having the automatic exposure controls of the invention with the possibility of controlling the electronic flash structure, the light measurement value obtained by the external photosensitive means is compensated by the operation of the internal photosensitive means, and a determination is automatically made as to whether or not synchronized flash is required, with the exposure of the film properly controlled either with or without the synchronized flash, and for proper exposure the slit width of the focal plane shutter and the flash time duration are caused to match each other.

The great advantage achieved with the automatic exposure controls of the invention, from a practical point of view, resides in the fact that a control circuit of extremely hige accuracy and high reliability is achieved in order to carry out the above-mentioned operations automatically and and electrically in connection with the camera mechanism. One of the outstanding advantages of the above structure of the invention resides in the fact that all of the operations are carried out without requiring attachment of any special means to the camera.

What is claimed is:

1. In a camera, electrical computing means for computing from electrical factors which respectively correspond to aperture, film speed, and lighting conditions at the object to be photographed, an electrical quantity corresponding to the exposure time required for proper exposure in accordance with said factors, operator-actuated electrical selecting means for selecting an electrical quantity corresponding to an exposure time selected by the operator, electrical comparing means electrically connected with said selecting means and computing means for comparing said quantities and for automatically assuming a given condition when the exposure time corresponding to said computed quantity is greater than the exposure time corresponding to said selected quantity, flash means for providing additional illumination at the object to be photographed, flash-actuating means electrically connected to said comparing means and said flash means for automatically responding to said condition of said comparing means for actuating said flash means to provide said additional illumination when the exposure time corresponding to said computed quantity is greater than the exposure time corresponding to said selected quantity, electrical timing means electrically connected with said computing means for determining a proper exposure time according to all of said factors with or without said additional illumination, and exposure-terminating means electrically connected with said timing means to be actuated thereby for terminating an exposure after an interval determined by said timing means.

2. The combination of claim 1 and wherein said computing means includes a conductor for conducting an electrical current which forms said computed quantity, said selecting means being in the form of a variable resistor connected in series with said conductor and providing a resistance value which forms said selected quantity, whereby both of said quantities provide at said conductor and resistor a voltage drop whose magnitude corresponds to the magnitudes of said quantities, and said comparing means being electrically connected with said resistor and conductor for responding to said voltage drop to determine whether or not said comparing means assumes said condition.

3. The combination of claim 1 and wherein said exposure-terminating means is in the form of an electromagnetic means for terminating the exposure, a pair of transistor means connected electrically with said electromagnetic means for controlling the latter, one of said transistor means being electrically connected with said comparing means to respond to operation thereof for controlling said electromagnetic means when said comparing means does not assume said condition and the other of said transistor means being electrically connected with said flash-actuating means to respond to operation thereof for controlling said electromagnetic means when said comparing means assumes said condition.

4. The combination of claim 3 and wherein a delay means is electrically connected with said other transistor means for adapting the control of said electromagnetic means to the operation of said flash means.

5. The combination of claim 1 and wherein an external photosensitive means is electrically connected with said computing means for feeding the factor of lighting conditions at the object to be photographed to said computing means prior to and during film exposure with light which is received from the object to be photographed and which is external to an objective of the camera, internal photosensitive means for receiving light from the object after the light has passed through the camera objective, and electrical compensating means electrically connected with said external and internal photosensitive means for compensating the output of said external photosensitive means in accordance with the output of said internal photosensitive means.

6. The combination of claim 1 and wherein a switch means is electrically connected with said timing means for rendering the latter operative immediately subsequent to comparing of said quantities by said comparing means.

7. The combination of claim 1 and wherein a flash-terminating means is electrically connected with said flash means for terminating the operation thereof, and SCR means electrically connected with said timing means, said flash-terminating means, and said exposure-terminating means for responding to said timing means to actuate said exposure-terminating means after elapse of said interval and to actuate said flash-terminating means after said interval when said comparing means assumes said condition.

8. The combination of claim 1 and wherein said comparing means includes a transistor which is in a non-conductive state when said comparing means assumes said condition, said flash-actuating means including a transistor electrically connected with said transistor of said comparing means for assuming a conductive state when said comparing means assumes said condition.

9. The combination of claim 8 and wherein said exposure-terminating means is in the form of an electromagnetic means, and a pair of parallel-connected transistors connected electrically to said electromagnetic means for controlling the latter to terminate an exposure, one of said pair of transistors being electrically connected with said transistor of said flash-actuating means to be rendered operative for controlling said electromagnetic means when said transistor of said flash-actuating means is conductive, and the other of said transistors being electrically connected to said transistor of said comparing means for controlling said electromagnetic means when said transistor of said comparing means does not assume said condition and is in a conductive state.

10. In a camera, electromagnetic means for terminating an exposure, a pair of parallel-connected transistors electrically connected with said electromagnetic means, flash means for providing flash illumination, said flash means being electrically connected to one of said pair of transistors for acting through the latter on said electromagnetic means to control the latter for terminating an exposure made with flash illumination, and additional transistor means for determining whether exposure will be made with or without flash illumination, said additional transistor means being electrically connected with said flash means for rendering the latter operative when a determination is made by said additional transistor means that an exposure with flash illumination will be carried out, said additional transistor means being electrically connected with the other of said pair of parallel-connected transistors for acting through the latter on said electromagnetic means to control the latter for terminating an exposure when said additional transistor means determines that an exposure is being made without flash illumination.

11. The combination of claim 10 and wherein a delay means is electrically connected between said one of said pair of parallel-connected transistors and said flash means.

12. The combination of claim 10 and wherein an input means is electrically connected with said additional transistor means for delivering to the latter an input in accordance with the difference between an automatically computed exposure time and an operator-selected exposure time, said additional transistor means rendering said flash means operative when the computed exposure time is greater than the selected exposure time and controlling said electromagnetic means through the other of said pair of parallel-connected transistors when the computed exposure time is less than the selected exposure time.

* * * * *